United States Patent [19]

Altherr

[11] E Re. 29,011

[45] Reissued Oct. 26, 1976

[54] RAILWAY COUPLER SHANK KEYSLOT CONTOUR

[75] Inventor: Russell George Altherr, Munster, Ind.

[73] Assignee: AMSTED Industries Incorporated, Chicago, Ill.

[22] Filed: Mar. 31, 1975

[21] Appl. No.: 563,614

Related U.S. Patent Documents

Reissue of:

[64] Patent No.: 3,858,729
Issued: Jan. 7, 1975
Appl. No.: 349,995
Filed: Apr. 11, 1973

[52] U.S. Cl. ..... 213/64; 213/67 R; 213/69

[51] Int. Cl.[2] ..... B61G 7/00

[58] Field of Search ..... 213/50.5, 51, 62, 63, 213/64, 65, 67, 69

[56] References Cited

UNITED STATES PATENTS

| | | | |
|---|---|---|---|
| 1,506,811 | 9/1924 | Brockelsby | 213/64 X |
| 3,568,857 | 3/1971 | Altherr | 213/64 |
| 3,612,296 | 10/1971 | Kulieke | 213/64 X |

*Primary Examiner*—M. H. Wood, Jr.
*Assistant Examiner*—Gene A. Church
*Attorney, Agent, or Firm*—Fred P. Kostka; Ralph M. Faust

[57] ABSTRACT

The keyslot of a railway coupler shank is modified to eliminate the interference between the coupler shank and draft key during conditions of buff or draft during vertical curve negotiation of the cars when traversing uneven track. The upper and lower walls of the keyslot diverge from the rear bearing surface of the keyslot adjacent the butt of the coupler shank. Thus the keyslot opening is wider in the front portion than at the rear portion.

3 Claims, 8 Drawing Figures

RAILWAY COUPLER SHANK KEYSLOT CONTOUR

Matter enclosed in heavy brackets [ ] appears in the original patent but forms no part of this reissue specification; matter printed in italics indicates the additions made by reissue.

BACKGROUND OF THE INVENTION

This patent relates to a railway coupler having a shank with a keyslot therein and a draft key projecting through the keyslot.

Although "E" couplers are not constructed to angle vertically, they do angle vertically under buff or draft loading when negotiating vertical curves. In coupler arrangements currently in use, the striker clearance over the coupler shank of a standard coupler allows more vertical angle than can be accommodated by the clearance of the draft key in the coupler keyslot and in the car center sill keyslot. This clearance can become even greater as a result of wear before it would become necessary to make repairs by adding a shim beneath the top wall of the striker opening.

It is for the above reasons that any upward force applied at the coupler pulling face may induce such adverse conditions as bent draft keys, draft keys exhibiting excessive local wear or even coupler shanks being split at the forward portion of the keyslot. In addition, excessive wear can occur on the top and bottom of the striker keyslot due to buff or draft motion while the coupler is angled vertically.

Many of the aforementioned problems in extreme cases can have serious results; for example, a severely bent draft key would be more susceptible to failure under draft loads and can restrict lateral motion of the coupler.

OBJECTS OF THE INVENTION

The present invention overcomes the beforementioned difficulties and limitations by providing an improved coupler keyslot contour which eliminates interference between the draft key and the coupler shank keyslot.

Accordingly, it is the object of the invention to provide an improved coupler keyslot contour for a railroad coupler shank that allows vertical angulation of the coupler head and shank within the striker casting without encountering interference between the draft key and coupler shank.

Another object of the invention is to provide a new and novel improved keyslot contour that provides sufficient vertical angulation to enable the use of an "F" coupler head on an "E" type coupler shank.

A further object of the invention is to provide a new and novel improved keyslot contour in each end of a solid drawbar that provides at each end of said drawbar adequate vertical angulation required for the cars when traversing vertical curves and negotiating uneven sections of track.

These and other objects and advantages of the invention will become apparent from a study of the attached drawings and from a reading of the description of the preferred embodiment.

DESCRIPTION OF THE PREFERRED EMBODIMENT

Figure 1:
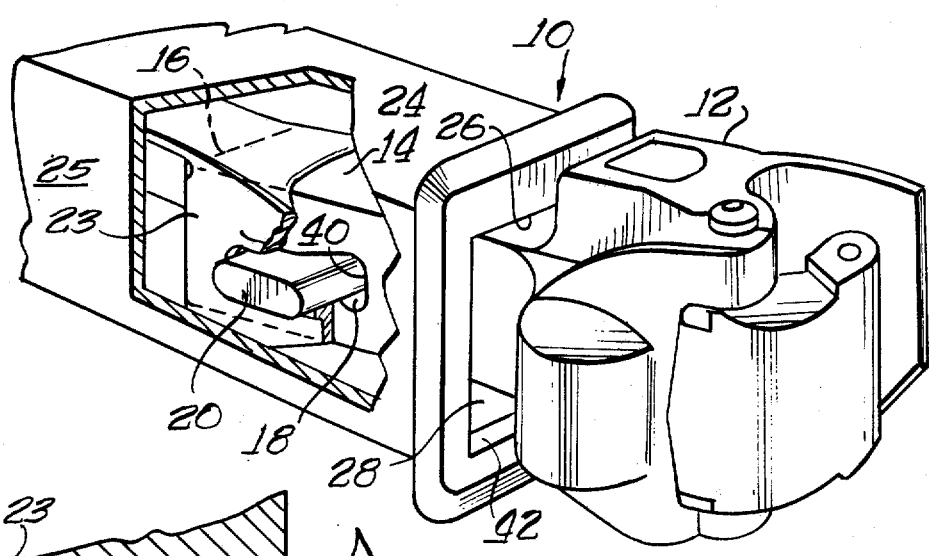
FIG. 1 is a perspective view of a standard-type railroad E-coupler vertically angled in a striker, a portion of the striker and yoke being removed to show the relation between the new keyslot contour and the draft key.

Referring now more particularly to the drawings, there is shown in FIG. 1 a standard-type railroad E-coupler positioned in a car end, (although an F-coupler could be used in this embodiment) shown generally at 10, which comprises a coupler head 12 having attached thereto a coupler shank 14 which terminates at the butt end 16 of the coupler shank 14. The butt end 16 of the coupler 10 contains a horizontal keyslot 18 that extends laterally through shank 14 adjacent the butt 16. The keyslot 18 is positioned to receive a load transmitting draft key 20 which simultaneously passes through keyslot 18, similar fixed keyslots (not shown) located on each side of the striker casting 24 (only one side of which is shown) and similar yoke keyslots 22 located on either side of the yoke 23, also fixed except for limited longitudinal motion. Both the yoke 23 and striker casting 24 receives the coupler shank 14 of the coupler 10. Each yoke keyslot 22 is generally longer than the keyslot 18 located in the coupler shank 14 so as to accommodate longitudinal travel of the coupler 10 and coupler shank 14 under buff conditions.

When the coupler 10 is under buffing conditions the coupler load is transmitted through the butt end 16 to the draft gear (not shown) which is housed behind the butt end 16 of the coupler 10 in the car center sill 25. In such a buff condition, the draft key 20 is unloaded and allowed to move rearward in the yoke keyslots 22 of the yoke 23 with no buff loading between the keyslot 18 and the draft key 20.

When the coupler 10 is under straight pulling conditions the coupler load is transferred to the yoke 23 by means of the draft key 20. Under these conditions the draft key 20 is in the forward-most portion of the yoke keyslots 22.

The prior art arrangements permitted adequate horizontal angling of the coupler 10 under both buff and draft loading.

Because E-couplers do not have the vertical angulatory freedom associated with the common F-type coupler many are under the impression that E-couplers do not angle vertically. However they do angle vertically under either buff conditions or during draft loading during vertical curve negotiation of cars and when the cars are traversing uneven track. For example in a new assembly, the nominal striker clearance over the coupler shank 14 of a standard E-coupler 10 is approximately ⅞ of an inch. If the coupler were allowed to rise through that full clearance that would result in more angle than can be accommodated by the clearance between the draft key 20 in the coupler keyslot 18 while the draft key 20 is being denied rotation by the yoke keyslot 22 and simultaneously in the keyslot (not shown) in the striker casting. This clearance can become as large as 1½ inches before it is necessary to make repairs by adding a shim beneath the top wall 26 of the striker opening 28.

Figure 2:
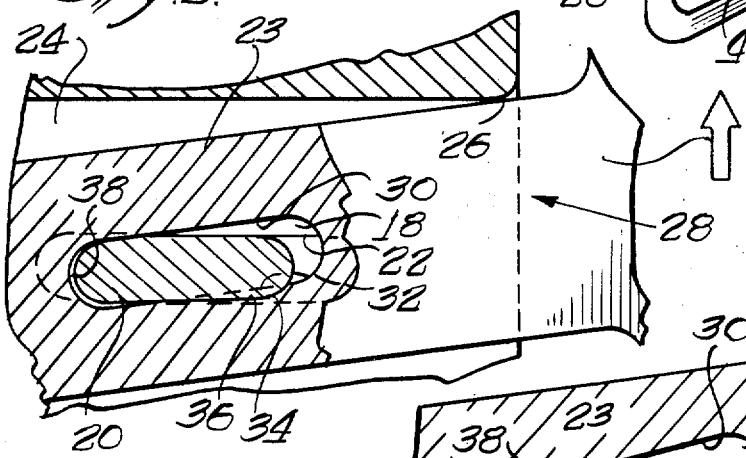
FIG. 2 is a side elevational view of a coupler shank proximate the butt end, a yoke keyslot and striker, the assembly being partly in section and showing the interference conditions between the fixed yoke keyslot, shank keyslot, and draft key in prior art arrangements (This is the only figure showing the prior art shank keyslot contour).

For a clearer understanding of the interference conditions that can occur between the draft key 20 and the coupler shank 14 during vertical angulation of the coupler 10; reference is made to FIG. 2 of the drawings.

The yoke keyslots 22 in the yoke 23 are substantially horizontal relative to the coupler shank 14 which is shown in a condition of maximum vertical angulation wherein the coupler shank 14 engages the top wall 26 of the striker opening 28. The yoke keyslots 22 limit the rotation of the draft key 20 which is being forced to rotate because of the forces being applied to it by the upper wall 30 and lower wall 32 of the keyslot 18 in the coupler shank 14. Thus the amount of interference that exists is illustrated by the area of overlap 34 between the lower wall 32 of the coupler keyslot 18 and the lower surface 36 of the draft key 20.

Figure 3:
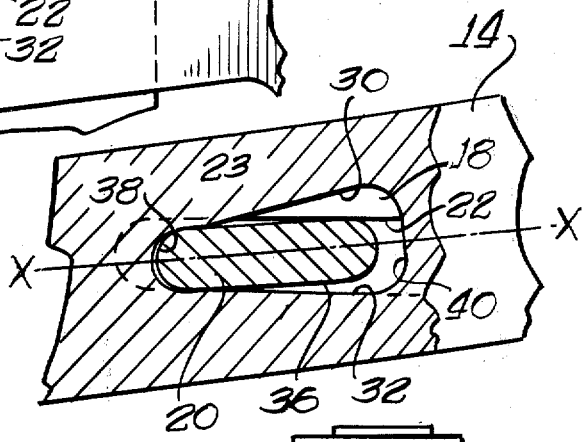
FIG. 3 is a view similar to that of FIG. 2 showing the use of the improved keyslot contour in relieving the interference conditions that had existed in prior art arrangements.

FIG. 3 illustrates the new and improved contour for the coupler keyslot 18 wherein the upper wall 30 and lower wall 32 diverge away from the longitudinal axis X—X of the coupler shank 14 in a forwardly direction away from the butt end 16 toward the coupler head 12. Thus relatively narrow spacing is maintained between the upper wall 30 and lower wall 32 of the keyslot 18 at the rear bearing surface 38 adjacent the butt end 16 and relatively wide spacing is maintained between the upper wall 30 and lower wall 32 of the keyslot 18 at the forward bearing surface 40 proximate the coupler head 12.

Use of the new improved contour for the coupler keyslot 18 as illustrated in FIG. 3 clearly shows that the interference condition that existed in prior art arrangements has been eliminated, as clearance now exists between the lower wall 32 of the keyslot 18 and the lower surface 36 of the draft key 20.

Figure 4:
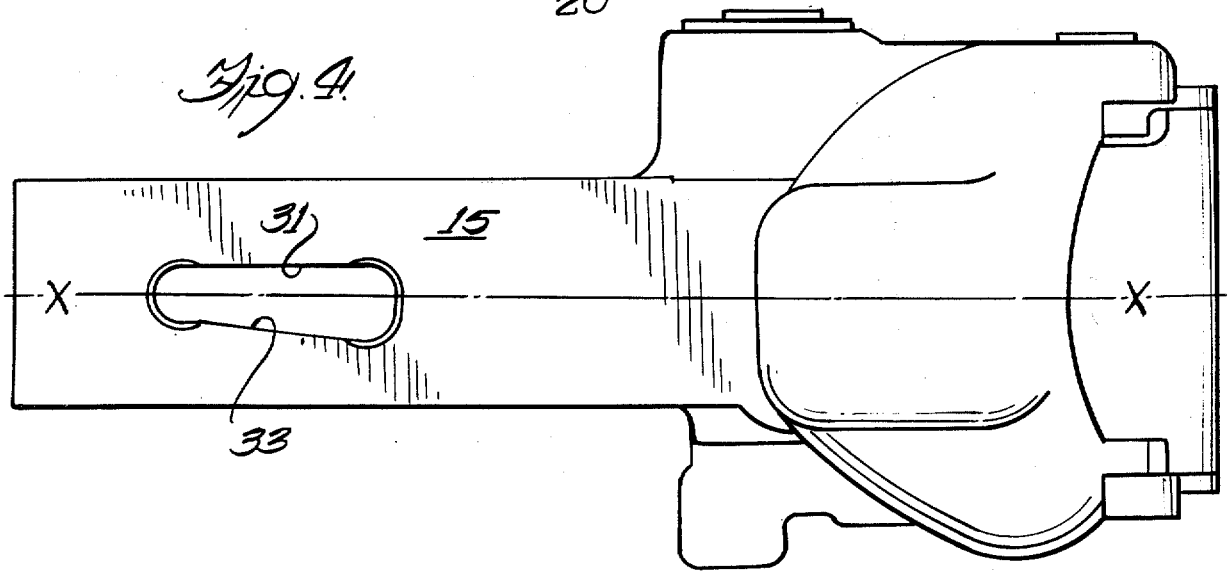
FIG. 4 is a side elevational view of a standard-type "E" coupler shank showing one embodiment of the improved keyslot contour of the invention.
Figure 5:
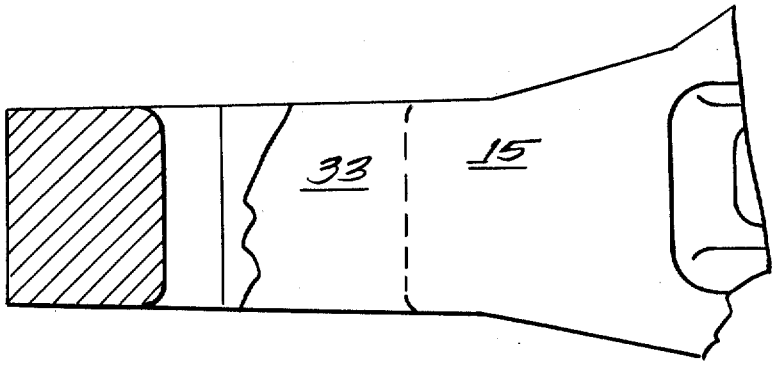
FIG. 5 is a plan view, shown partially in section, of the butt end of the coupler shank shown in FIG. 4 showing one embodiment of the improved keyslot contour of the invention.

Referring now to FIGS. 4 and 5 there is shown a modification of the improved keyslot contour of the invention wherein the upper wall 31 is substantially parallel to the longitudinal axis X—X and the lower wall 33 diverges in a forwardly direction away from the longitudinal axis X—X and the upper wall 31.

The contour of FIG. 3 may be used on an "E," "F" and solid drawbar arrangements, whereas the modification shown in FIG. 4 is intended for use only with an E-type coupler arrangement. The reason being that only upward vertical angulation must be accommodated inasmuch as the carrier 42 (FIG. 1) prevents the coupler from angling downward; thus interference between the upper wall 31 of the shank 15 and the draft key (not shown) is not a problem.

Figure 6:
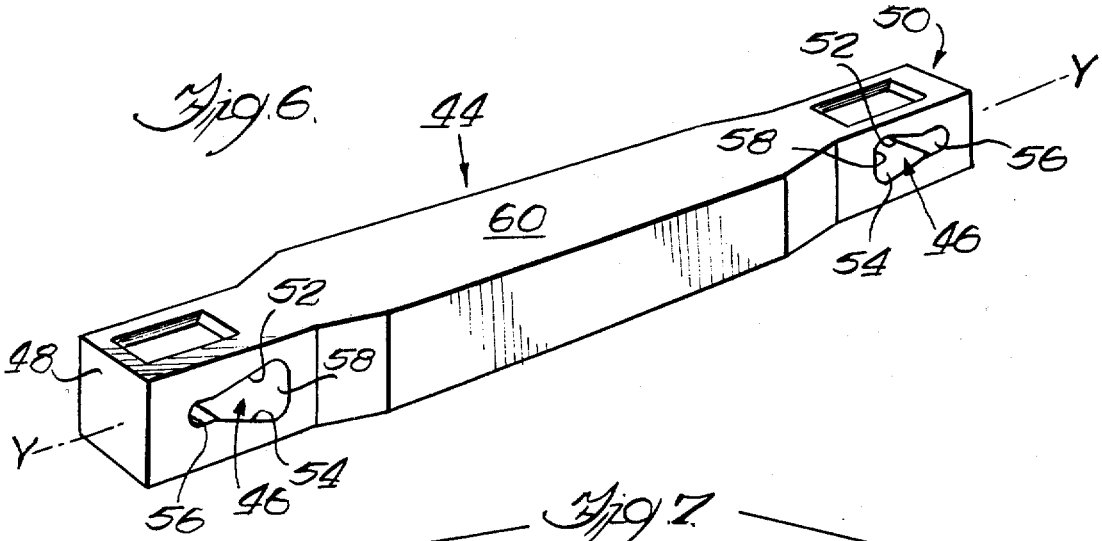
FIG. 6 is a perspective view of a solid drawbar showing an embodiment of the improved keyslot contour on each end thereof.
Figure 7:
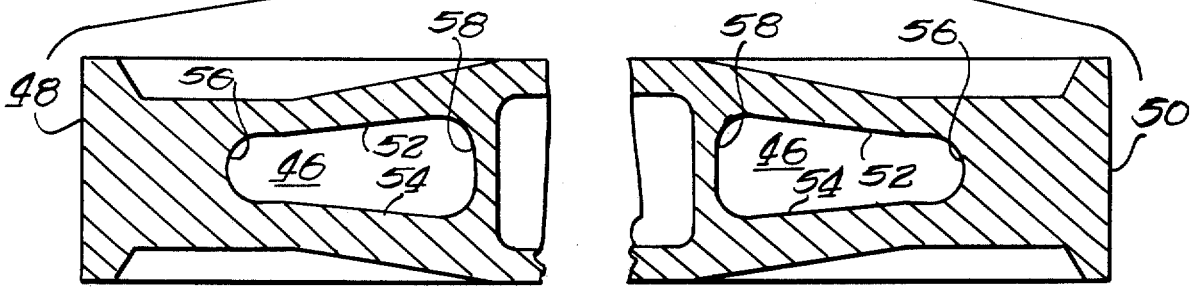
FIG. 7 is a fragmentary sectional side view taken on the longitudinal axis Y—Y of FIG. 6 illustrating the embodying features of the invention.
Figure 8:
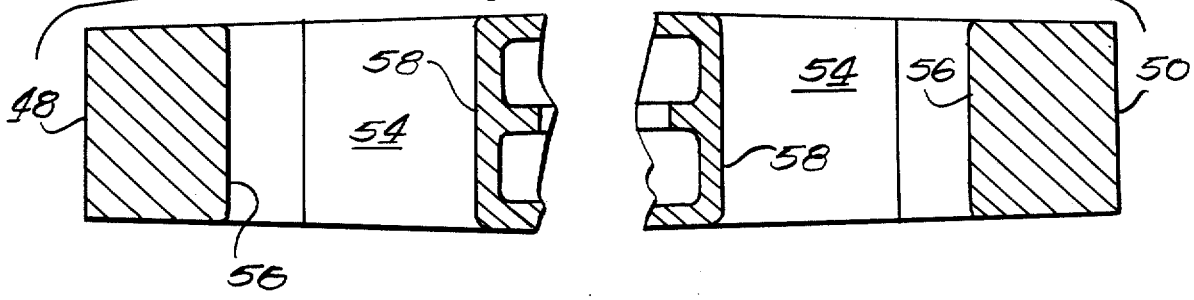
FIG. 8 is a fragmentary plan view in section taken on the longitudinal axis Y—Y of FIG. 6 illustrating the embodying features of the invention.

FIGS. 6 through 8 illustrate a solid drawbar 44 using the improved keyslot contour. The improved keyslot contour makes possible the use of a solid drawbar 44 with an E-type striker casting 24 and yoke 23 similar to that shown in FIG. 1. Such an arrangement is made possible as a result of the increased vertical angulation derived from the improved keyslot contour.

The preferred embodiment of the keyslot contour is illustrated in FIGS. 6 through 8 once again in conjunction with the solid drawbar 44 wherein a keyslot 46 having the improved contour is located near the butt ends 48 and 50 of the drawbar 44 with each keyslot 46 passing laterally through the drawbar 44 perpendicular to the longitudinal axis 7—7 of the drawbar 44.

The upper wall 52 and lower wall 54 of each keyslot 46 diverge away from the outward bearing surface 56 adjacent the drawbar butt ends 48 and 50 and toward the inward bearing surface 58 proximate the widened mid-section 60 of the drawbar 44. Thus each of the keyslots 46 becomes wider as it approaches the mid-section 60 of the drawbar 44.

The new improved keyslot contour as previously described may be used in connection with many other coupling arrangements not specifically set forth herein. For example an E-type shank having the improved keyslot contour and mounted within an E-type yoke in conjunction with a spring supported carrier, could then be equipped with an F-type coupler head. Use of an F-type coupler head and an E-type shank would afford greater safety than a standard E-coupler assembly at less cost than a standard F-coupler assembly.

While all of the objects and advantages of the invention have been provided for in the embodiment and modification shown, it is apparent that many changes in details of construction may be made without departing from the spirit and scope of the invention, which is expressed in the accompanying claims and the invention is not to be limited to the exact matters shown and described since only the preferred embodiment has been given by way of illustration only.

I claim:

1. In a railway coupler shank having a longitudinal axis extending the length of said shank from front to rear, the improvement comprising; a substantially horizontal keyslot in the rear portion of said shank extending between the vertical sides and through said shank perpendicular to said longitudinal axis for receiving a key attaching said shank to a draft gear yoke and extending through a slot in the sides of a striker casing; said keyslot having spaced upper and lower surfaces, said upper surface being substantially parallel to the longitudinal axis of said coupler shank and said lower surface diverging downwardly and forwardly away from said upper surface, said upper and lower surfaces merging with forward and rear bearing surfaces.

*2. In a railway coupler shank having a longitudinal axis extending the length of said shank from front to rear, the improvement comprising; a substantially horizontal keyslot in the rear portion of said shank extending between the vertical sides and through shank perpendicular to said longitudinal axis for receiving a key attaching said shank to a draft gear yoke and extending through a*

*slot in the sides of a striker assembly; said keyslot having spaced upper and lower surfaces, said upper surface having a portion substantially parallel to the longitudinal axis of said coupler shank merging with a rear bearing surface and said lower surface having a diverging portion diverging downwardly and forwardly away from said upper surface merging with a forward bearing surface.*

*3. In a railway coupler shank having a longitudinal axis extending the length of said shank from front to rear, the improvement comprising a substantially horizontal keyslot in the rear portion of said shank extending between the vertical*

*sides and through said shank perpendicular to said longitudinal axis for receiving a key attaching said shank to a draft gear yoke and extending through a slot in the sides of a striker assembly; said keyslot having spaced upper and lower surfaces each with a rear portion substantially parallel to a longitudinal axis of said coupler and merging with rear bearing surface and a forward portion of at least one of said surfaces diverging from the longitudinal axis forwardly from said parallel rear portions and connected to a forward bearing surface.*

* * * * *